United States Patent
Zegelin

(10) Patent No.: US 7,542,770 B2
(45) Date of Patent: Jun. 2, 2009

(54) METHOD FOR MOBILE UNIT LOCATION ESTIMATE IN A WIRELESS LAN

(75) Inventor: Chris Zegelin, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 893 days.

(21) Appl. No.: 10/861,182

(22) Filed: Jun. 4, 2004

(65) Prior Publication Data

US 2004/0264404 A1 Dec. 30, 2004

Related U.S. Application Data

(60) Provisional application No. 60/475,593, filed on Jun. 4, 2003.

(51) Int. Cl.
- G01S 3/02 (2006.01)
- H04B 17/00 (2006.01)
- H04B 7/00 (2006.01)
- H04Q 7/20 (2006.01)
- H04M 3/00 (2006.01)

(52) U.S. Cl. .............. 455/456.3; 455/41.2; 455/115.3; 455/226.2; 455/419; 455/456.5; 455/510; 455/513; 455/522; 342/450

(58) Field of Classification Search .............. 455/513, 455/456.1, 456.3, 456.5, 456.2, 510, 522, 455/41.2, 419, 115.3, 226.2; 342/450
See application file for complete search history.

(56) References Cited

U.S. PATENT DOCUMENTS

| | | | | |
|---|---|---|---|---|
| 6,922,557 B2 * | 7/2005 | Fantaske | ...................... | 455/403 |
| 6,947,734 B1 * | 9/2005 | Toubassi | ..................... | 455/423 |
| 7,065,325 B2 * | 6/2006 | Zegelin et al. | ........... | 455/67.11 |
| 7,155,247 B2 * | 12/2006 | Busch | ......................... | 455/513 |
| 7,286,833 B2 * | 10/2007 | Friday et al. | ............. | 455/456.1 |
| 7,289,463 B2 * | 10/2007 | Ozugur | ...................... | 370/328 |
| 7,336,960 B2 * | 2/2008 | Zavalkovsky et al. | ....... | 455/453 |
| 2003/0100328 A1 * | 5/2003 | Klein et al. | .................. | 455/522 |
| 2003/0146871 A1 * | 8/2003 | Karr et al. | .................... | 342/457 |
| 2003/0206532 A1 * | 11/2003 | Shpak | ........................ | 370/322 |
| 2003/0217150 A1 * | 11/2003 | Roese et al. | ................. | 709/225 |
| 2004/0054767 A1 * | 3/2004 | Karaoguz et al. | ........... | 709/223 |
| 2004/0063455 A1 * | 4/2004 | Eran et al. | .................. | 455/525 |
| 2005/0009521 A1 * | 1/2005 | Preece | ...................... | 455/435.1 |
| 2005/0013280 A1 * | 1/2005 | Buddhikot et al. | .......... | 370/349 |
| 2005/0185626 A1 * | 8/2005 | Meier et al. | ................. | 370/338 |
| 2007/0004444 A1 * | 1/2007 | Klein et al. | ................. | 455/522 |
| 2008/0109885 A1 * | 5/2008 | Sim et al. | ...................... | 726/5 |

* cited by examiner

*Primary Examiner*—Fan Tsang
*Assistant Examiner*—Lisa Hashem

(57) ABSTRACT

Association request messages received by one or more access points of a wireless local area network are used to infer the location of a mobile unit requesting association. Association may be refused for security purposed if it is determined that the mobile unit is not within an area services by the wireless network. In addition the inferred location can be used to assign the mobile unit to an access point for association.

9 Claims, 5 Drawing Sheets

US 7,542,770 B2

METHOD FOR MOBILE UNIT LOCATION ESTIMATE IN A WIRELESS LAN

PRIORITY CLAIM

This application claims the benefit of the filing date of provisional application Ser. No. 60/475,593, filed Jun. 4, 2003 and assigned to the same assignee as the present invention.

BACKGROUND OF THE INVENTION

This invention relates to wireless local area networks, (WLANs) such as those networks which operate in accordance with IEEE Standard 802.11. In particular, the invention relates to a method for estimating location of a mobile unit requesting association with one or more access points of a WLAN for purposes of assigning an access point for association with the mobile unit or refusing association if it is determined that a mobile unit is not within an area designated for service by the WLAN.

The present invention is applicable to systems which use a cell controller and RF Ports, as described in application Ser. No. 09/528,697, filed May 17, 2000, which is assigned to same assignee as the present invention, and which is incorporated herein by reference, and which are marketed by the assignee of the present invention. It will be recognized by those skilled in the art that the method of the invention can also be practiced by other WLAN configurations, such as those which use conventional access points.

It is an object of the invention to provide methods for estimating location of mobile units seeking association with an access point of a WLAN, and for using the estimated location for controlling access.

SUMMARY OF THE INVENTION

In accordance with the invention there is provided a method for operating a wireless local area network having a plurality of access points distributed over an area, wherein mobile units request association with access points. A first association request is received from a mobile unit at an access point. The association request is recorded in a processor of the network and the association request is denied. The receiving, recording and denying are repeated until association requests have been recorded for a selected plurality of access points in the network. A location for the mobile unit with respect to the area is inferred using the recorded association requests. Association with an access point is authorized based on the inferred location.

In a preferred embodiment of the method, association is authorized only if a location within the area is inferred. Receiving the association request may include determining received signal strength, wherein recording includes recording data corresponding to signal strength, and wherein inferring a location comprises inferring location based on the signal strength data for the plurality of access points. Recording may also include recording time of occurrence of the association requests and wherein inferring a location may comprise using recorded association requests occurring within a selected time period. The inferred location of mobile unit may be used to select an access point for association with the mobile unit.

In accordance with the invention there is provided a method for operating a wireless local area network having a plurality of access points distributed over an area, wherein mobile units request association with access points. A first association request is received from a mobile unit at an access point. The access point sends a NACK response to force the mobile unit to repeat the association request message and the time between the NACK signal and the repeated association request message is times to determine the range between the access point and the mobile unit. The association request and data corresponding to the range are recorded in a processor of the network and the association request is denied. The receiving, recording and denying are repeated until association requests have been recorded for a plurality of access points in the network. A location for the mobile unit with respect to the area is inferred using the recorded data and association requests. Association with an access point is authorized based on the inferred location.

In accordance with the invention there is provided a method for operating a wireless local area network having at least one access point, wherein mobile units request association with an access point. An association request is received from a mobile unit at an access point. A directed signal is sent from the access point to the mobile unit. An acknowledgement, or ACK, signal is sent from the mobile unit to the access point in response to the directed message. The time between the directed signal and the ACK signal is determined thereby to determine range to the mobile unit from the access point. Association with the access point is authorized only if the range is less than a predetermined value.

DETAILED DESCRIPTION OF THE INVENTION

Figure 1:
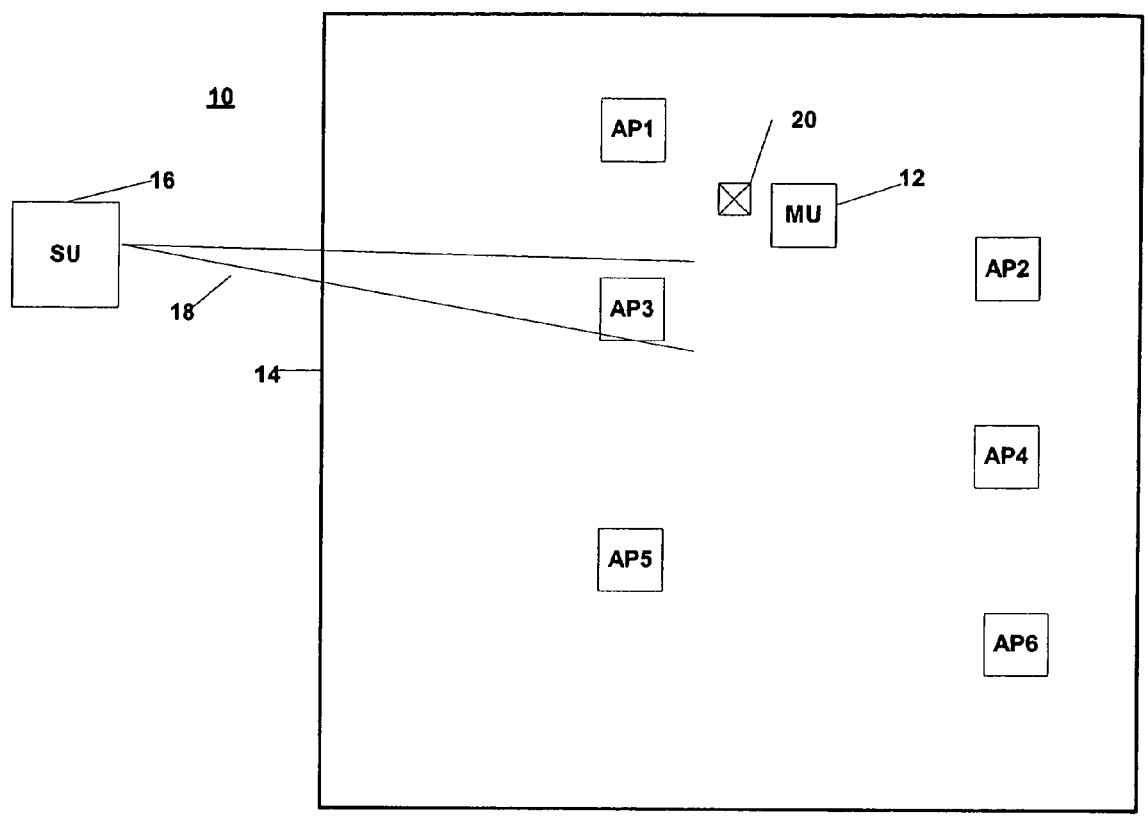
FIG. 1 is a diagram representing the layout of a WLAN in which the method of the invention may be practiced.

Referring to FIG. 1 there is shown a WLAN configuration 10 suitable for practice of the methods of the present invention. The WLAN 10 is intended to provide wireless local area communication services within a physical area 14, which may, for example be an industrial or government facility and may for example use IEEE Standard 802.11 protocol. WLAN 10 includes a plurality of access points, labeled AP1, AP2, AP3, AP4, AP5 and AP6 located at selected locations within area 14. Also shown in FIG. 1 is a mobile unit 12 and an RF barrier 20.

It should be understood that the access points are connected to a wired local area network, which may include one or more computers and other devices, such as telephone access devices. It should also be understood that the term "access point" as used herein refers to conventional access point devices as contemplated by Standard 802.11, as well as RF port devices as described in application Ser. No. 09/528, 697.

Some of the embodiments of the Method according to the present invention, particularly the first embodiment, are more easily practiced in a WLAN configuration according to application Ser. No. 09/528,697, as shown in FIG. 2, but it is not contemplated that the methods claimed are limited to this configuration, and the invention can be practiced using conventional access point configurations.

Figure 2:
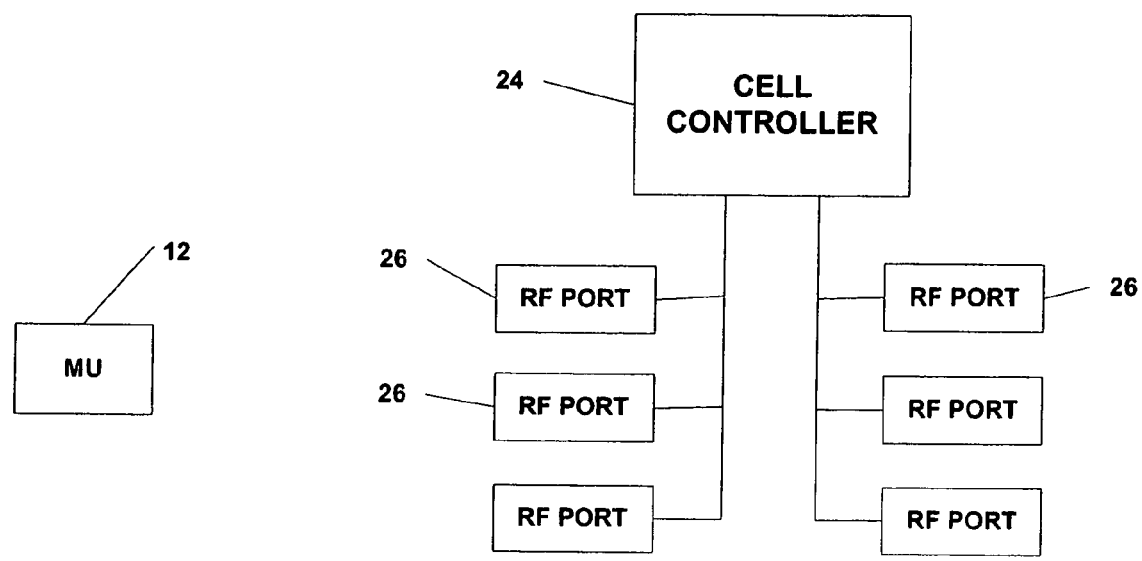
FIG. 2 is a diagram illustrating the configuration of a cell controller and RF Ports as described in application Ser. No. 09/528,697 filed Mar. 17, 2000.

FIG. 2 is a block diagram of a cell controller 24, which may for example comprise a personal computer processor and memory with connections to a wired network and RF Ports 26. As described in the referenced co-pending application, the cell controller of the FIG. 2 system is arranged to perform higher level MAC functions including association and roaming. According when the RF Ports of the FIG. 2 system receive association requests from mobile units the association request messages are provided to the cell controller, which handles the association process. In accordance with a first embodiment of the present invention, shown in the flow diagram of FIG. 3, the cell controller denies the first association request received from a mobile unit, and sends the association refusal message to the mobile unit via the RF Port.

Upon receiving the association denial message, the mobile unit will attempt association with another RF Port within signaling range, as determined by beacon signals received by the mobile unit from the RF Ports. Again the cell controller will record and deny the association request. When the cell controller has received and recorded association requests from a mobile unit via a selected number of RF Ports, for example three RF Ports, the processor of the cell controller infers the location of the mobile unit with respect to area 14.

One method that may be used by the cell controller is the identity and order of the access points with which the mobile unit attempts association. In the example of FIG. 1, mobile unit 12 would likely be within range of access points AP1, AP2 and AP3. Accordingly the cell controller or another processor, such as a network control processor, associated with these access points can infer that the mobile unit is within an area roughly bounded by these three access points.

One advantage of the method of the present invention is that by use of inferred location it becomes possible to deny access to a mobile unit at an inferred location that is outside area 14. The drawing of FIG. 1 shows a mobile "spy unit" (SU) 16 which is located outside area 14 and uses a directional antenna beam 18 to attempt to gain unauthorized access to the WLAN. The characteristics of the directional beam cause the unit 16 to attempt association only with one or two access points within the beam 18. In the example illustrated access points AP3 and perhaps AP2 or AP4 would be within the beam 18. Unit 16 would therefore attempt association with access point AP3 and either AP2 or AP4, but would be unlikely to attempt access with the selected number, such as three or more access points.

Figure 3:
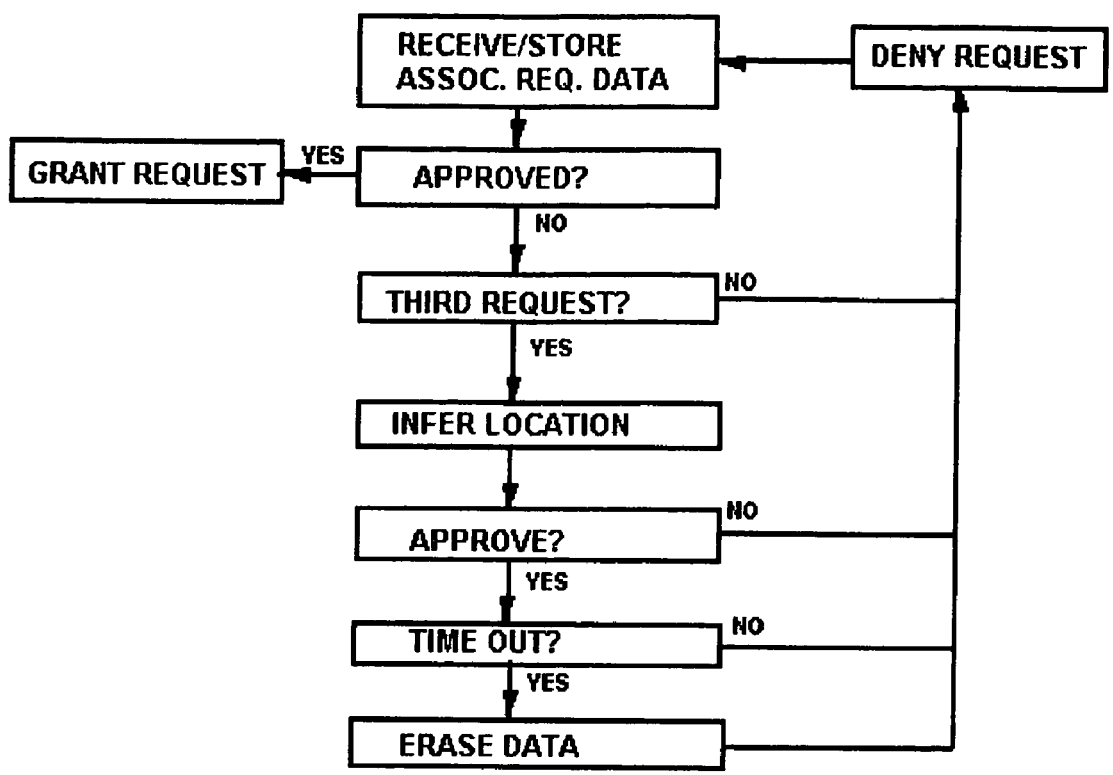
FIG. 3 is a flow diagram illustrating an exemplary embodiment of the method of the invention.

It is recognized that steering of beam 18 can cause unit 16 to attempt association with additional access points. Additional association requests typically are sent within 200 Msec. of the initial request. For this reason, the system preferably uses a time-out feature, as shown in FIG. 3, so that subsequent access requests that occur after a time out period of perhaps 300 Msec. are regarded as new requests. For example if a second or subsequent access request from the same mobile unit is not received within this time-out period, the data corresponding to the initial request is erased, and it becomes difficult for the mobile unit to achieve the required number of access requests to gain access to the WLAN.

Other techniques are possible to infer the location of a mobile unit seeking access to a WLAN. In one technique, the received signal strength of an association request signal received at an access point is obtained and recorded with the association request. When the selected number of association requests for a mobile unit have been recorded, the location of the mobile unit can be inferred using signal strength location determination or relative received signal strength location techniques.

Figure 4:
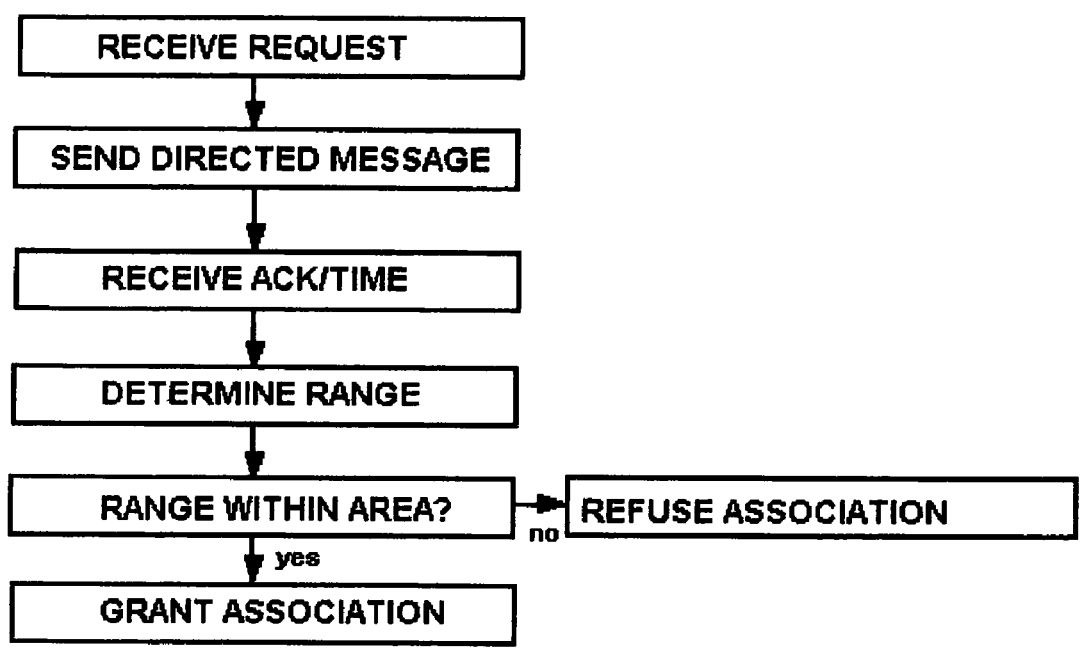
FIG. 4 is a flow diagram illustrating a further exemplary embodiment of the method of the invention.

Another technique to infer location of a mobile unit, as shown in FIG. 4, is to provide software in the access point or RF Port that automatically sends a directed signal to a mobile unit when a signal is received from a non-associated mobile unit. The directed signal causes the mobile unit to send an acknowledgement (ACK) signal, and the range of the mobile unit from the access point or RF Port can be estimated from the time between the directed signal and the ACK signal. Using such range determination it is not necessary to have the mobile unit request association with a number of access points, since the presence of the mobile unit within the area 14 can be inferred from a single range measurement. An alternate approach is to have the access point send a not acknowledge (NACK) signal when it receives an association request. The NACK signal forces the mobile unit to repeat the request and range can be determined by the time delay between the NACK signal and the repeated request.

Figure 5:
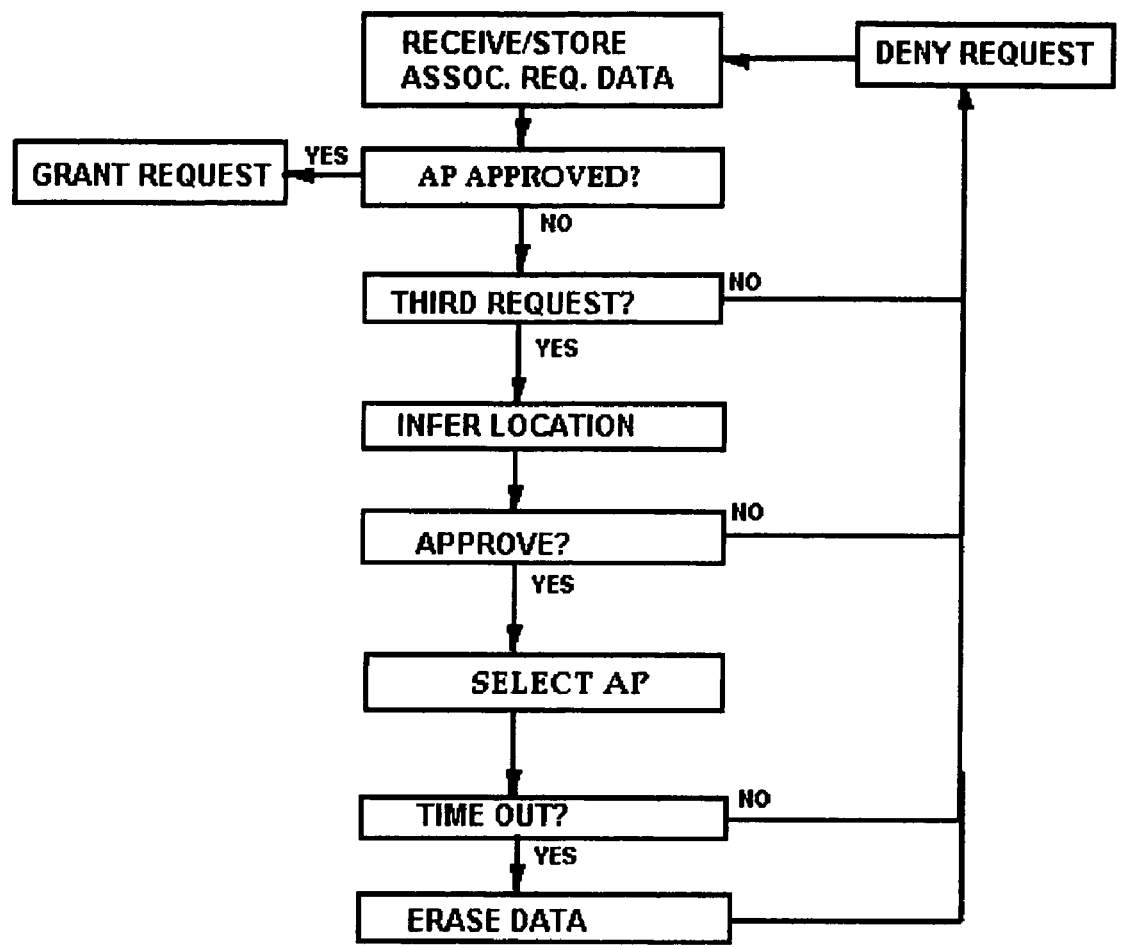
FIG. 5 is a flow diagram illustrating a further exemplary embodiment of the method of the invention.

In addition to providing a security feature, the location determination of the present invention can be used to assist in assigning an access point for association by a mobile unit, as shown in the flow diagram of FIG. 5. For example, in the configuration of FIG. 1 there is shown structure 20 which may be building structure or a large piece of equipment that causes distortion of radio signals in the immediate vicinity of mobile unit 12. This structure may cause mobile unit 12 to receive a greater or lesser signal from adjacent access points than would be present in the absence of structure. If the location of mobile unit 12 with respect to the access points is inferred using the method of the present invention it may be desirable to assign an access point on the basis of mobile unit location rather than beacon signal strength, since small movement of the structure 20 or mobile unit 12 may cause a large change in signal strength.

An advantage of the present invention is that the method can be implemented without any change in the hardware configuration of the WLAN. The method can be implemented by providing software updates to the access points, RF Ports, cell controller and/or network control processor. In addition the method operates with any compatible mobile units without modification thereto.

While there have been described what are believed to be the preferred embodiments of the present invention, those skilled in the art will recognize that other and further changes and modifications may be made thereto without departing from the spirit of the present invention, and it is intended to claim all such changes and modifications as fall within the true scope of the invention.

What is claimed is:

1. A method for operating a wireless local area network having a plurality of access points distributed over an area, wherein mobile units request association with access points, compnsing:

receiving a first association request from a mobile unit at an access point, recording said association request in a processor of said network and denying said association request;

repeating said receiving, recording and denying until association requests have been recorded for a selected plurality of access points in said network;

inferring a location for said mobile unit with respect to said area using said recorded association requests; and authorizing association with an access point based on said location.

2. A method as specified in claim 1 wherein said association is authorized only if a location for said mobile unit within said area is inferred.

3. A method as specified in claim 1 wherein receiving said association request includes determining received signal strength, wherein recording includes recording data corresponding to received signal strength, and wherein inferring a location comprises inferring location based on said signal strength data for said plurality of access points.

4. A method as specified in claim 1 wherein said recording includes recording time of occurrence of said association requests and wherein said inferring a location comprises using recorded association requests occurring within a selected time period.

5. A method as specified in claim 1 wherein an access point is selected for association based on said inferred location.

6. A method for operating a wireless local area network having a plurality of access points distributed over an area, wherein mobile units request association with access points, comprising:
   a. receiving an association request from a mobile unit at an access point;
   b. sending a not acknowledge (NACK) signal from said access point to cause said mobile unit to repeat said association request and determining a time between said NACK signal and said repeated association request thereby to determine range to said mobile unit from said access point;
   c. recoding said association request and data corresponding to said range in a processor of said network and denying said association request;
   d. repeating steps a. to c. until association requests have been recorded for a selected plurality of access points in said network;
   e. inferring a location for said mobile unit with respect to said area using said recorded association requests; and
   f. authorizing association with an access point based on said inferred location.

7. A method as specified in claim 6 wherein said association is authorized only if a location for said mobile unit within said area is inferred.

8. A method as specified in claim 6 wherein said recording includes recording time of occurrence of said association requests and wherein said inferring a location comprises using recorded association requests occurring within a selected time period.

9. A method as specified in claim 6 wherein an access point is selected for association based on said inferred location.

* * * * *

UNITED STATES PATENT AND TRADEMARK OFFICE
CERTIFICATE OF CORRECTION

PATENT NO. : 7,542,770 B2 Page 1 of 1
APPLICATION NO. : 10/861182
DATED : June 2, 2009
INVENTOR(S) : Zegelin It is certified that error appears in the above-identified patent and that said Letters Patent is hereby corrected as shown below:

IN THE SPECIFICATION

In Column 2, Line 5, delete "times" and insert -- timed --, therefor.

IN THE CLAIMS

In Column 4, Line 56, in Claim 1, delete "compnsing:" and insert -- comprising: --, therefor.

Signed and Sealed this

Ninth Day of February, 2010

David J. Kappos
*Director of the United States Patent and Trademark Office*